Dec. 5, 1961 K. H. SEVERSON 3,011,279

CARD HOLDERS

Filed Oct. 7, 1959

INVENTOR.
KERMIT H. SEVERSON
BY John L. Woodward
Attorney

United States Patent Office 3,011,279

Patented Dec. 5, 1961

3,011,279

CARD HOLDERS

Kermit H. Severson, Chevy Chase Drive, Rte. 2, Wayzata, Minn.

Filed Oct. 7, 1959, Ser. No. 844,897
1 Claim. (Cl. 40—10)

This invention relates to a card holder, and more especially to card holders mounted in vehicles such as automobiles, trucks, etc. for holding and displaying service information cards.

Heretofore, the service information for a vehicle was generally displayed on a long tape secured to the door frame of a vehicle etc. The service information on the tape was not readily visible or available to the driver.

My card holder comprises a relatively small device which requires limited space for mounting. The holder is formed of a transparent plastic material and comprises a compartment which is provided with the minimum cross-sectional area at the bottom and which compartment's cross-sectional area gradually increases from the bottom to an outlet in the upper end of the holder. A sheet of relatively thin cardboard is creased or scored to provide two panels. The card is inserted into the compartment of the holder and the panels are urged into engagement with the sides of the compartment. The faces of the panels exposed to the sides of the compartment bear the service information concerning the vehicle in which it is mounted.

It is an object of this invention to provide in a card holder for carrying a card bearing the service record of a vehicle, means for furnishing more information in a limited area.

It is another object of this invention to provide in a card holder for carrying a card bearing the service record of a vehicle, means whereby the service record is visible to the operator of the vehicle.

It is still another object of this invention to provide a card holder for carrying a card bearing the service record of a vehicle, means for securely holding the card in a compartment of the holder.

It is a further object of this invention to provide in card holders for carrying a card bearing the service record of a vehicle which is protected from damage and which can be filed as a permanent record.

Other and further objects of this invention will be apparent to those skilled in the art.

My invention consists in the construction, arrangement and combination of the various parts of the device, whereby the objects contemplated are attained as hereinafter more fully set forth, pointed out in my claim, and illustrated in the accompanying drawing, in which:

Figure 1:
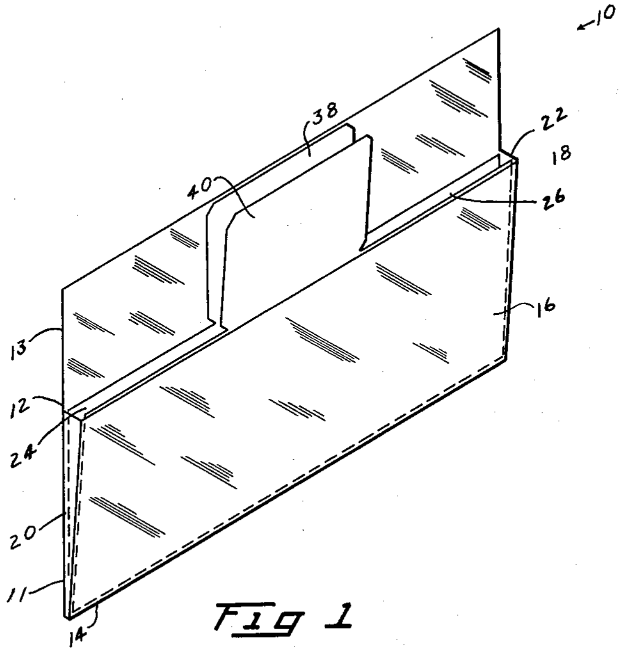
FIGURE 1 is a perspective view of the card holder carrying an indicia bearing card.
Figure 3:
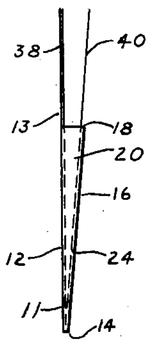
FIGURE 3 is an end elevational view of the card holder disclosing a card carried in normal position in the card holder.
Figure 4:
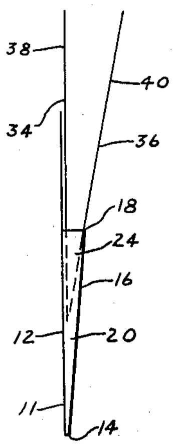
FIGURE 4 is an end elevational view of the card holder similar to FIGURE 3 disclosing the indicia bearing card substantially withdrawn from the holder.

Referring in detail to the drawing, 10 indicates the card holder made of a suitable transparent plastic having suitable strength for its intended uses. The card holder 10 comprises a rear vertical side 12 of rectangular shape, a narrow elongated bottom 14, a front side 16 of rectangular shape which slopes or is inclined outwardly from the bottom 14 to its top edge 18, and opposed ends 20 and 22. The front and rear sides, bottom and the ends of the holder 10 provide a compartment 24 which is provided with the minimum area adjacent the bottom 14 and in which the cross-sectional area of the compartment 24 gradually increases from the bottom 14 to the top edge 18 adjacent the outlet 26 for the compartment 24.

The rear face of the lower portion 11 of the side 12 of the holder 10 carries an adhesive for mounting the holder 10 to a flat surface such as the glass covering in the dash instruments or sun visor. The rear face of the upper portion 13 of side 12 does not carry an adhesive so that the holder 10 may be easily demounted from its mounted position on the vehicle. The rear face of the upper portion 13 carries advertising which is painted thereon. The upper portion being transparent permits the painted advertising to be clearly viewed and the color of the vehicle can be seen through the transparent portion 13 of the side 12.

A card 30 of rectangular shape is creased or scored at 32 adjacent its mid-section thus dividing the card 30 into two equal panels, 34 and 36 so that the card 30 can be fitted into compartment 24. The scored line 32 is not formed too deeply in the card 30 to prevent the folded card 30 when withdrawn from the compartment 24 of the holder 10 to tend to return to its normally flat position. Tabs 38 and 40 are formed on the top edges of the panels 34 and 36 respectfully providing means for inserting the card 30 into compartment 24 and removing the card 30 from the compartment 24.

The frictional contact between the panels 34 and 36 of the card 30 and the sides of the compartment 24 is less when the tabs 38 and 40 are forced together and the card 30 can then be easily removed from the compartment 24 of the holder 10. The holder 10 may be turned upside down without the card 30 falling from the compartment 24 of the holder 10 because the card 30 is tightly mounted in the compartment 24. Both surfaces of tabs 38 and 40 bear advertising indicia.

Figure 2:
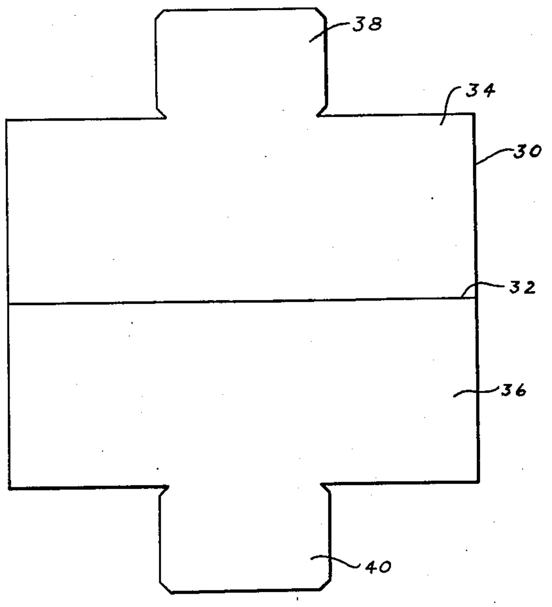
FIGURE 2 is a plan view of the indicia bearing card employed in the card holder.

The top faces of the panels 34 and 36, see FIGURE 2, bear advertising indicia. The bottom or reverse sides of the panels 34 and 36 bear the service record of the automobile with which it is used. This service record may include dates and mileage of various services performed in the care of an automobile such as oil changes, oil filter service, lubrications, differential service, checking of tires, etc.

The card 30 is folded for engaging the front faces of the panels 34 and 36. The folded card 30 is then inserted through outlet 26 into the compartment 24. When the card is completely mounted in the compartment 24, the panels 34 and 36 of the card 30 tend to seek their normal flat position, thus the bottom faces of the panels 34 and 36 which bear the service record are urged against the opposite sides of the compartment. The card 30 is tightly held in the compartment 24 of the holder 10. The service record on the reverse face of panel 36 can be readily viewed through the transparent front 16 of the holder 10.

The tabs 38 and 40 of the card 30 extend above the outlet 26 of compartment 24 when the card 30 is completely inserted in the compartment 24. The tabs 38 and 40 provide means for the operator of a vehicle to remove the card 30 when it is desired to observe the service record on the reverse face of panel 34 of the card 30 or to record new service information on the card 30 etc.

As the indicia bearing card 30 is moved farther out of the compartment 24 of the holder 10, the tabs 38 and 40 are moved farther apart so that the card 30 can be easily withdrawn from the compartment 24. The folded card 30 carried in compartment 24 tends to move toward its normally flat position as it is withdrawn from the compartment 24, because the cross-sectional area of the compartment 24 gradually increases from the bottom 14 to the outlet 26 at its top.

It can readily be seen that the indicia bearing card 30 is securely held in the card holder 10. That the folded card bears more information in a limited space than prior service sheets etc. The service record is visible and readily available at all times.

The compartment 24 could be of rectangular shape, or the holder could be only a pair of spaced guideways of gradually increasing cross-sectional area.

Changes may be made in the construction and arrangement of my improved holder without departing from the real spirit and purpose of my invention and it is my intention to cover by my claim any modified forms of structure or use of mechanical equivalents which may be reasonably included within their scope.

I claim:

In a card holder of the class described comprising a compartment having opposed sides provided with an outlet at its upper end, the compartment having its minimum cross-sectional area at its bottom, the cross-sectional area of the compartment gradually increasing from the bottom to the outlet, a flat indicia bearing card being scored dividing it into two opposed panels, the scored card tending to return to its normally flat condition, the card so carried in the compartment that the said opposed panels are urged into tight engagement with the opposite sides of the compartment and a tab formed on the opposed panels of the card which extends above the outlet of the compartment when the card is carried in the compartment whereby the card can be removed from the compartment.

References Cited in the file of this patent

UNITED STATES PATENTS

| | | |
|---|---|---|
| 1,956,527 | DeGrott | Apr. 24, 1934 |
| 2,193,296 | Pienzak | Mar. 12, 1940 |
| 2,799,107 | McArthur | July 16, 1957 |
| 2,892,275 | Woofter | June 30, 1959 |